United States Patent
Burich et al.

(10) Patent No.: US 12,517,674 B2
(45) Date of Patent: Jan. 6, 2026

(54) DYNAMIC BIT FLIP THRESHOLDS BASED ON SOFT BIT AND MATCH BIT

(71) Applicant: Micron Technology, Inc., Boise, ID (US)

(72) Inventors: Mariano Eduardo Burich, San Diego, CA (US); Sivagnanam Parthasarathy, Carlsbad, CA (US); Mustafa N. Kaynak, San Diego, CA (US); Eyal En Gad, Santa Clara, CA (US); Phong S. Nguyen, Livermore, CA (US); Dung Viet Nguyen, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/781,696

(22) Filed: Jul. 23, 2024

(65) Prior Publication Data

US 2025/0110658 A1    Apr. 3, 2025

Related U.S. Application Data

(60) Provisional application No. 63/587,552, filed on Oct. 3, 2023.

(51) Int. Cl.
*G06F 12/00* (2006.01)
*G06F 3/06* (2006.01)
*H03M 13/11* (2006.01)

(52) U.S. Cl.
CPC .......... *G06F 3/0655* (2013.01); *G06F 3/0619* (2013.01); *G06F 3/0679* (2013.01); *H03M 13/1111* (2013.01)

(58) Field of Classification Search
None
See application file for complete search history.

(56) References Cited

U.S. PATENT DOCUMENTS

| | | |
|---|---|---|
| 2015/0381206 A1 | 12/2015 | Fainzilber et al. |
| 2021/0143837 A1 | 5/2021 | Asadi et al. |
| 2021/0271549 A1 | 9/2021 | Khayat et al. |
| 2022/0206710 A1 | 6/2022 | Alrod et al. |

(Continued)

OTHER PUBLICATIONS

Prathyusha, S., & Sree, V. (2014). Hard Decision and Soft Decision Decoding Algorithms of LDPC and Comparision of LDPC With Turbo Codes, RS Codes and BCH Codes (pp. 978-993). https://www.digitalxplore.org/up_proc/pdf/93-1406552433112-117.pdf (Year: 2014).*

(Continued)

*Primary Examiner* — Daniel D Tsui
(74) *Attorney, Agent, or Firm* — Lowenstein Sandler LLP (57) ABSTRACT

A soft input is obtained from a sense word corresponding to encoded host data read from the memory device and decoded using a parity-check matrix. A match array is maintained. Each iteration of an error correcting code operation a number of unsatisfied check nodes of a respective bit of the sense word is calculated for each bit of the sense word. A bit flip threshold from a threshold data structure is obtained based on a current iteration of the error correcting code operation, a soft bit associated with the respective bit, and a match bit associated with the respective bit. The respective bit is flipped based on the number of unsatisfied check nodes satisfying the bit flip threshold.

20 Claims, 5 Drawing Sheets

(56) References Cited

U.S. PATENT DOCUMENTS

2023/0044471 A1\* 2/2023 Kaynak .............. H03M 13/1111
2023/0308114 A1\* 9/2023 Kaynak ................ H03M 13/611

OTHER PUBLICATIONS

International Search Report and Written Opinion for International Application No. PCT/US2024/049663, mailed Jan. 15, 2025, 9 Pages.

\* cited by examiner

DYNAMIC BIT FLIP THRESHOLDS BASED ON SOFT BIT AND MATCH BIT

RELATED APPLICATIONS

This application claims the benefit of U.S. Provisional Patent Application No. 63/587,552, filed Oct. 3, 2023, which is incorporated by reference herein.

TECHNICAL FIELD

Embodiments of the disclosure relate generally to memory sub-systems, and more specifically, relate to dynamic bit flip thresholds based on soft bit and match bit.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to dynamic bit flip thresholds based on soft and match bit. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1A. A non-volatile memory device is a package of one or more dies. Each die can include one or more planes. For some types of non-volatile memory devices (e.g., NAND memory devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include cells arranged in a two-dimensional or a three-dimensional grid. Memory cells can be formed onto a silicon wafer in an array of columns connected by conductive lines (also hereinafter referred to as bitlines, or BLs) and rows connected by conductive lines (also hereinafter referred to as wordlines or WLs). A wordline can refer to a conductive line that connects control gates of a set (e.g., one or more rows) of memory cells of a memory device that are used with one or more bitlines to generate the address of each of the memory cells. In some embodiments, each plane can carry an array of memory cells formed onto a silicon wafer and joined by conductive BLs and WLs, such that a wordline joins multiple memory cells forming a row of the array of memory cells, while a bitline joins multiple memory cells forming a column of the array of memory cells. The intersection of a bitline and wordline constitutes the address of the memory cell. A block hereinafter refers to a unit of the memory device used to store data and can include a group of memory cells, a wordline group, a wordline, or individual memory cells addressable by one or more wordlines. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

One example of a memory sub-system is a solid-state drive (SSD) that includes one or more non-volatile memory devices and a memory sub-system controller to manage the non-volatile memory devices. The memory sub-system controller can encode data into a format for storage at the memory device(s). For example, a class of error detection and correcting codes (ECC), such as low density parity check (LDPC) codes, can be used to encode the data. LDPC codes are capacity-approaching codes, which means that practical constructions exist which allow the error threshold to be set very close to a theoretical maximum. This error threshold defines an upper bound for errors in the data, up to which the probability of lost information can be made as small as desired. LDPC codes are reliable and highly efficient, making them useful in bandwidth-constrained applications. For example, encoded data written to physical memory cells of a memory device can be referred to as a codeword. The data read from the cells, which might include errors and differ from the codeword, can be referred to as a sense word. The sense word can include one or more of user data, error correcting code, metadata, or other information.

The memory sub-system controller can perform decoding operations to decode the encoded data into the original sequence of bits that were encoded for storage on the memory device. In many cases, the encoded data is decoded using an iterative process. Segments of a data array can be decoded to produce a corresponding string of bits (e.g., a sense word). A number of bits of the decoded data received by the memory sub-system controller may have been flipped (i.e., reversed) due to noise, interference, distortion, bit synchronization errors, or errors from the media itself (both intrinsic and extrinsic). For example, a bit that may have originally been stored as a 0 may be flipped to a 1 or vice versa. A memory sub-system may perform error correcting code operations to attempt to correct errors (e.g., flipped bits) in a sense word. For example, a memory sub-system can perform error correcting code operations on stored data to detect and correct errors in the encoded data.

Generally, error correction in a memory sub-system is time- and resource-intensive. Certain memory sub-systems utilize algorithms, such as bit-flipping algorithms, to identify and correct the errors. Bit-flipping algorithms iteratively correct errors in the received codeword until it becomes a valid codeword or until a predefined number of iterations is reached. More specifically, the bit-flipping algorithm starts with the sense word, which might have some bit errors.

The bit-flipping algorithm calculates a syndrome vector to determine whether the sense word contains errors. The syndrome vector is calculated by multiplying the sense word and a parity-check matrix. The parity-check matrix is a matrix used to verify whether a given word (a string of numbers) is a valid codeword (a transmitted word that conforms to the rules of the LDPC). If the syndrome vector equals zero, the bit-flipping algorithm determines that decoding is successful. Otherwise, the bit-flipping algorithm determines that decoding is unsuccessful.

In response to an unsuccessful decoding, certain memory sub-systems conditionally flip each bit. In particular, the bit-flipping algorithm identifies non-zero values within the syndrome vector. Non-zero values within the syndrome vector represent unsatisfied check nodes. A check node is a node of a graph (e.g., a Tanner graph used to represent LDPC), in which each node represents a parity-check equation. A check node is considered unsatisfied (e.g., unsatisfied check nodes) if the sum of its neighboring variable nodes doesn't satisfy the corresponding parity-check equation (often a modulo-2 sum for binary codes). Variable nodes correspond to bits in the sense word.

The bit-flipping algorithm determines whether to flip a bit by comparing the number of unsatisfied check nodes with a threshold value. The threshold value serves as a criterion for making the decision to flip a bit. The threshold value may be a predetermined value or a value based on statistical models, simulations, or other heuristics. Accordingly, the bit-flipping algorithm solely flips the bit if the number of unsatisfied check nodes exceeds the threshold value. The bit-flipping algorithm iteratively calculates the syndrome vector, checks for successful decoding, and flips bits until decoding is successful or a maximum number of iterations is reached.

Based on the application, a memory sub-systems may utilize different versions of the bit-flipping algorithm, such as a hard-input bit-flipping algorithm or soft-input bit-flipping algorithm. Hard-input bit-flipping algorithm uses a hard input that is formed from hard decisions. Hard decisions is an outcome of a decision-making process where each bit in the sense word is interpreted as a '0' or a '1'. The decision-making process is solely based on its received value and without taking into account any additional information. Due to the lack of additional information, the hard-input bit-flipping algorithm may be highly susceptible to various factors, such as noise.

Soft-input bit-flipping algorithm uses soft input formed from soft decisions, which are the outcomes of a decision-making process. Soft input refers to a sequence of soft bits (or soft bit). Each soft bit (or soft bit) corresponds to a bit of sense word. In this process, each bit in the received signal is interpreted not just as a '0' or a '1', but also with accompanying reliability or confidence information (e.g., soft bit). This additional information is often represented in terms of probabilities, likelihoods, or Log-Likelihood Ratios (LLRs). While soft-input bit-flipping algorithm is an improvement over the hard-input bit-flipping algorithm, neither bit-flipping algorithm guarantees convergence towards a correct codeword.

Aspects of the present disclosure address the above and other deficiencies by providing a memory sub-system controller that utilizes soft bit and match bit to determine a bit flip threshold value for flipping bits during an error correcting code operation. Soft bits provide information regarding reliability or confidence represented in terms of Log-Likelihood Ratios (LLRs). Match bits provide information regarding whether a value of a bit of the sense word matches a value of the bit modified by the error correcting code operation. In some embodiments, the memory sub-system controller may maintain a table that provides a set of threshold values for each iteration of a predetermined number of iterations of the error correcting code operation. Each threshold value of the set of threshold values is identified by a unique combination of soft and match bit.

During each iteration, the memory sub-system controller, for each bit of the sense word, obtains soft bit associated with a bit of the sense word, from a soft input of the sense word and match bit associated with the bit of the sense word, from a match array. The match array refers to a sequence of match bit matching the length of the sense word. Each match bit of the match array is initialized to zero. The memory sub-system controller queries a metadata table to identify a corresponding bit flip threshold value associated with the soft bit, the match bit, and a current iteration of the error correcting code operation. Once the memory sub-system controller determines a number of unsatisfied check nodes associated with the bit, the memory sub-system controller compares the number of unsatisfied check nodes with the bit flip threshold value. Based on the comparison, the memory sub-system controller flips the bit of the sense word. The match array is updated based on a value of the flipped bit of the sense word matching the value of the bit of the sense word. Accordingly, the memory sub-system controller may generate an estimated codeword by performing an XOR operation on the match array and the sense word prior to error correcting code operations. The memory sub-system controller may determine a bit error count based on the match array.

Advantages of the present disclosure include, but are not limited to, dynamically adjusting a threshold used for flipping bit which increases the decoding efficiency of the memory sub-system, thereby increasing reliability, performance, and longevity of the memory sub-system.

Figure 1A:
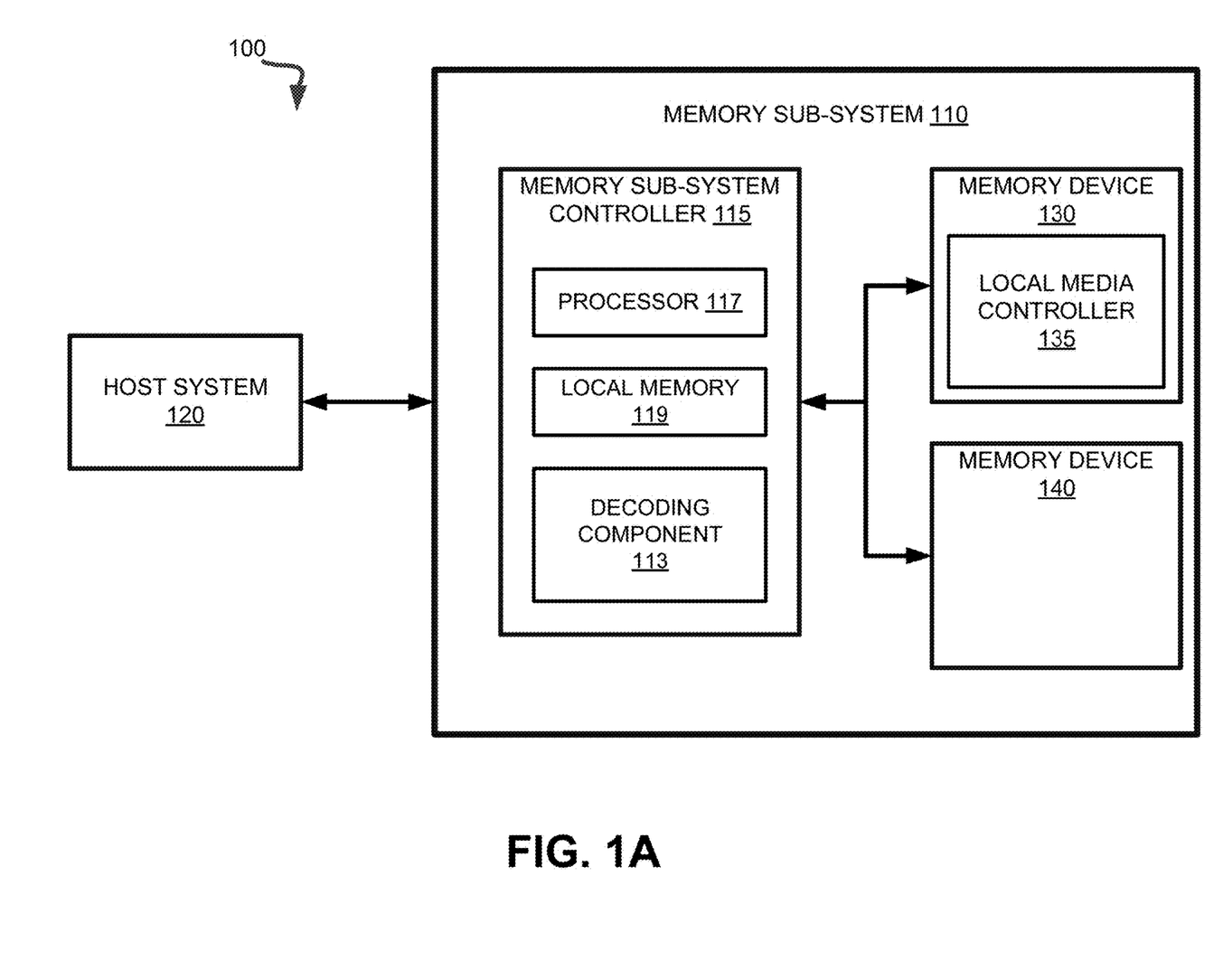
FIG. 1A illustrates an example computing system that includes a memory sub-system in accordance with some embodiments of the present disclosure.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In at least one embodiment, memory sub-system 110 may include a decoding component 113 that employs dynamically adjustable threshold values for a number of unsatisfied check nodes. In some embodiments, the memory sub-system controller 115 includes at least a portion of the decoding component 113. In some embodiments, the decoding component 113 is part of the host system 120, an application, or an operating system. In other embodiments, local media controller 135 includes at least a portion of decoding component 113 and is configured to perform the functionality described herein.

Decoding component 113 can receive a encoded data (e.g., host data encoded using a predefined matrix, such as a parity-check matrix) read from memory device 130 and/or 140 which might contain some bit errors. Decoding component 113 performs a decoding operation to decode the encoded data using an iterative process. Segments of a data array can be decoded to produce a corresponding string of bits (e.g., a sense word). Decoding component 113 may be derive hard input from the sense word. Hard input is a sequence of hard bits. The sequence of hard bits are an outcome of a decision-making process where each bit in the sense word is interpreted as a '0' or a '1'. Decoding component 113 may derive soft input from the sense word. Soft input is a sequence of soft bits. The sequence of soft bits is a probability (or a Log-Likelihood Ratio (LLR)) that indicates how likely it is that the corresponding hard bit is a '0' or a '1'. For example, a soft bit may be '0' indicating less reliability that the hard bit is a '0' or '1' or '1' indicating more reliability that the hard bit is a '0' or '1'.

Decoding component 113 may initialize a match array and store it in memory device 130 and/or 140. Match array is a sequence of match bits. The sequence of match bits indicate whether a current value of a bit of the sense word matches an original value of the bit of the sense word prior to any error correcting code operations. Initializing the match array includes setting a value of each bit of the sequence of match bits to zero ('0'), indicating a match (e.g., the current value of the bit of the sense word match the original value of the bit of the sense word prior to any error correcting code operations).

Decoding component 113 may iteratively perform error correcting code operations to correct errors in the sense word until it becomes valid or a predefined number of iterations of the error correcting code operations is reached. At the beginning of each iteration of the error correcting code operation, decoding component 113, as noted above, calculates, based on the predefined matrix and the sense word, a syndrome vector to determine whether the sense word contains errors. The syndrome vector is calculated by multiplying the sense word and a parity-check matrix. If the syndrome vector does not equal zero (e.g., 0), decoding component 113 determines that the sense word contains errors and was unsuccessfully decoded. As a result, the decoding component 113 performs an error correcting code operation to correct errors in the sense word. Otherwise, decoding component 113 determines that the sense word contains no errors and was successfully decoded.

Error correcting code operation of decoding component 113, for each bit of the sense word, obtains a number of unsatisfied check nodes for a respective bit. As previously described, unsatisfied check nodes refers to the non-zero values within the syndrome vector. A check node is associated with each row of the parity-check matrix. A check node is considered unsatisfied (e.g., unsatisfied check nodes) if the sum of its neighboring variable nodes doesn't satisfy the corresponding parity-check equation (often a modulo-2 sum for binary codes). Variable nodes correspond to bits in the sense word. Accordingly, to obtain the number of unsatisfied check nodes for a respective bit, the number of check nodes that are not satisfied are counted. Decoding component 113, for the respective bit, may obtain, a threshold table (e.g., dynamic threshold data structure), a bit flip threshold value used to decide whether or not flip a bit. The threshold table may be stored in the local memory 119 of the memory sub-system controller 115.

The threshold table includes a plurality of rows and a plurality of columns. Each column of the plurality of columns corresponds to an iteration of the predefined number of iterations. The number of columns of the plurality of columns depends on the predefined number of iterations. For example, if the number of iterations set during manufacturing increases, the number of columns increases to match the number of iterations. Each row of the plurality of rows corresponds to a unique combination a soft bit of the soft input and a match bit of the match array. In particular, each ordered pair of a cartesian product of soft input and match array corresponds to a row of the plurality of rows. Cartesian product is a mathematical operation that returns a set from all possible ordered pairs (a value from soft input, a value from match array). Essentially providing every unique combination of one value from soft input and match array. The number of rows of the plurality of rows depends on a number ordered pairs of the cartesian product of soft input and match array.

Each cell of the threshold table identified by the intersection of a row of the plurality of rows and a column of the plurality of columns stores a bit flip threshold value that would be used to determine whether to flip a bit of the sense word (e.g., based on a number of unsatisfied check nodes associated with the bit exceed the bit flip threshold value) or not (e.g., based on the number of unsatisfied check nodes associated with the bit not exceeding the bit flip threshold value).

Accordingly, decoding component 113 obtains, from the sense word, a soft bit associated with the respective bit. Decoding component 113 obtains, from the match array, a match bit associated with the respective bit. Then, error correcting code operation of the decoding component 113 obtains the bit flip threshold value from an entry of the threshold table based on an intersection of a column associated with a current iteration of the error correcting code operation and a row associated with the soft bit and match bit. Error correcting code operation of the decoding component 113 determines whether the number of unsatisfied check nodes for the respective bit exceeds the bit flip threshold value. Responsive to the number of unsatisfied check nodes for the respective bit exceeding the bit flip threshold value, error correcting code operation of the decoding component 113 flips the respective bit. In some embodiments, error correcting code operation of the decoding component 113 compares a value of the flipped respective bit to a value of the original respective bit (e.g., a hard bit of the hard input associated with the respective bit). Based on the comparison, error correcting code operation of the decoding component 113 updates a corresponding bit of the match array (e.g., set the corresponding bit to '0' if they match, otherwise, set the corresponding bit to '1').

Depending on the embodiment, decoding component 113 may determine a bit error count from the match array by counting the number of "1"s in the match array. Additionally, and/or alternatively, depending on the embodiment, decoding component 113 may determine an estimated sense word by performing an XOR operation on the match array and the sense word.

Figure 1B:
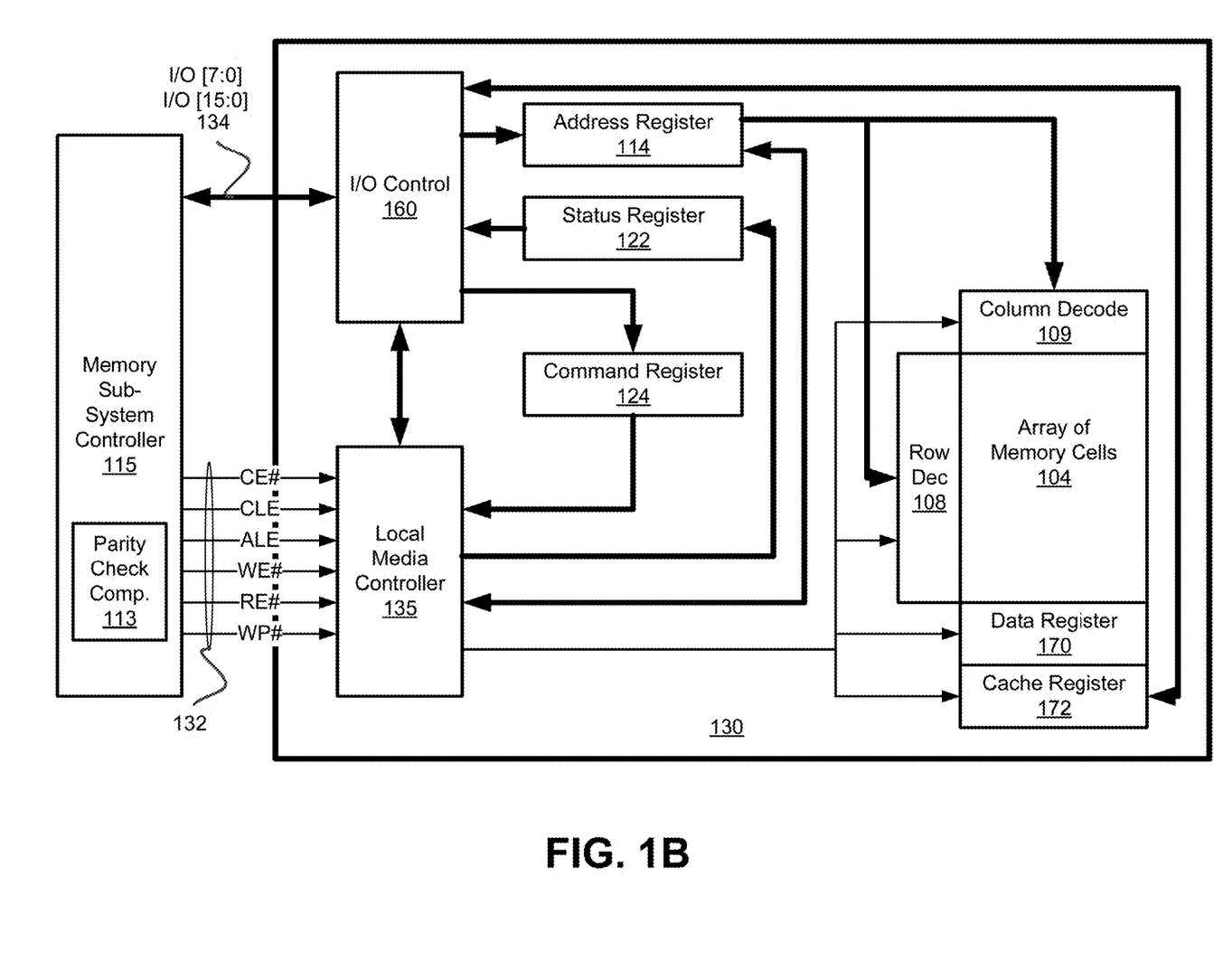
FIG. 1B illustrates a block diagram of a memory device in communication with a memory sub-system in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 236 and outputs data to the memory sub-system controller 115 over I/O bus 236.

For example, the commands may be received over input/output (I/O) pins [7:0] of I/O bus 236 at I/O control circuitry 160 and may then be written into command register 124. The addresses may be received over input/output (I/O) pins [7:0] of I/O bus 236 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
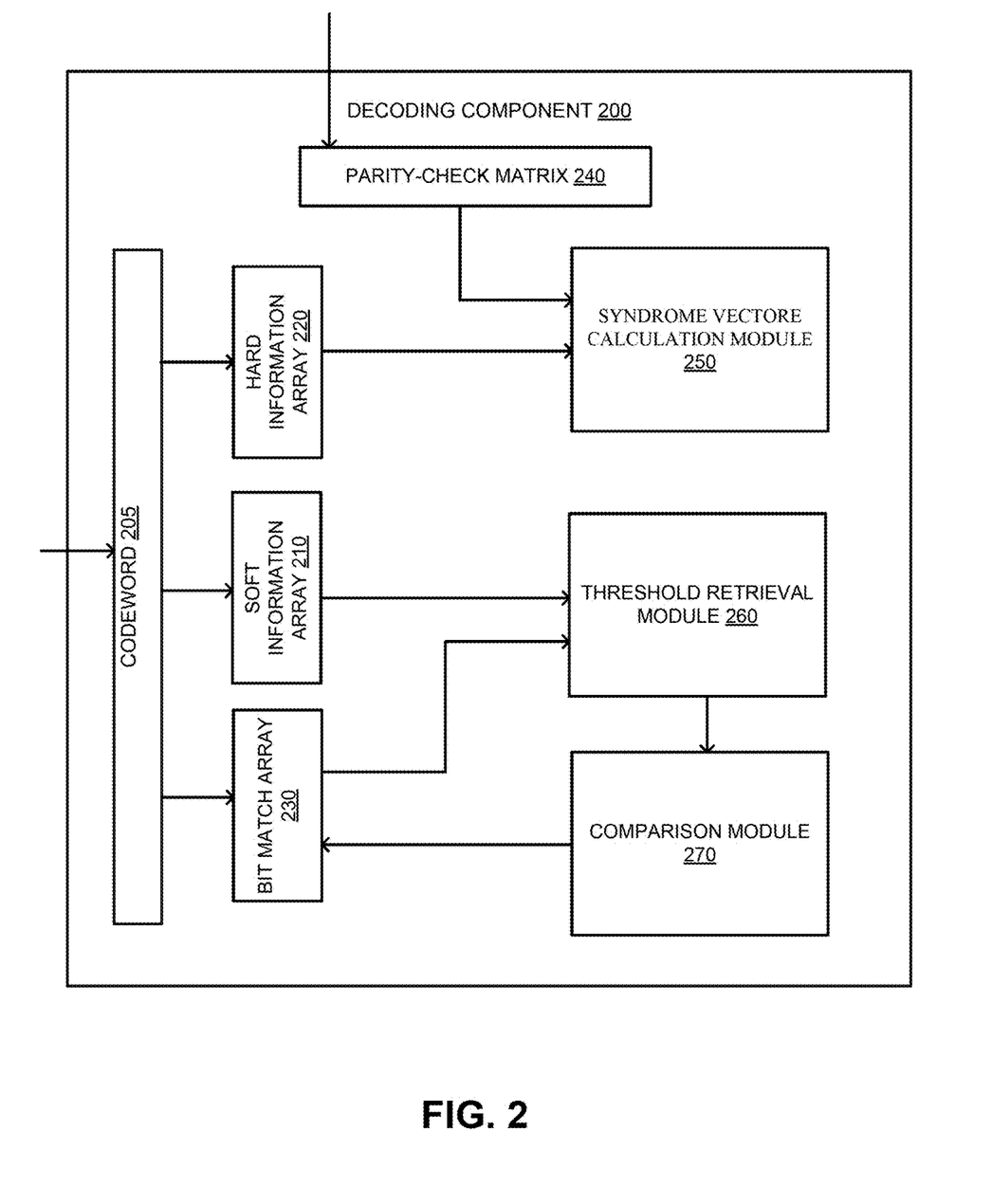
FIG. 2 illustrates a decoding component with dynamic bit flip thresholds based on soft bit and match bit, in accordance with some embodiments of the present disclosure.

FIG. 2 illustrates a decoding component with dynamic bit flip thresholds based on soft bit and match bit, in accordance with some embodiments of the present disclosure. Decoding component 200, similar to decoding component 113 of FIG. 1A, includes a soft input 210, a hard input 220, a match array 230, a parity-check matrix 240, a syndrome vector calculation module 250, a threshold retrieval module 260, and a comparison module 270.

Decoding component 200 may receive encoded data which might contain some bit errors (e.g., host data encoded using parity-check matrix 240) read from a memory device. Decoding component 200 performs a decoding operation to decode the encoded data to produce sense word 205. Decoding component 200 may determine that sense word 205 contains errors. In particular, the syndrome vector calculation module 250 utilizes sense word 205 (or hard input 220) and the parity-check matrix 240 to calculate a syndrome vector. If the syndrome vector does not equal zero ('0'), decoding component 200 determines that sense word 205 contains errors. Otherwise, decoding component 200 determines that sense word 205 contains no errors and was successfully decoded.

Decoding component 200 may derive soft input 210 from sense word 205 and hard input 220 from sense word 205. Hard input 210 is a sequence of hard bits. Each of the hard bits indicates whether a corresponding bit of sense word 205 is interpreted as a '0' or '1'. Soft input 210 is a sequence of soft bits. Each of the soft bits indicates how likely a hard bit associated with a corresponding bit of sense word 205 is '0' or '1'. Decoding component 200 may generate and initialize the match array 230. Match array 230 includes a sequence of match bits. Each of the match bits indicate whether a current value of a corresponding bit of sense word 205 matches an original value of the corresponding bit of sense word 205 prior to any error correcting code operations (e.g., obtained from hard input). Each of the match bits of the match array may be preset to '0'.

Responsive to determining that sense word 205 contains errors, decoding component 200 iteratively performs error correcting code operations to correct the errors in sense word 205. Decoding component 200 iteratively performs error correcting code operations for a predetermined number of iterations or until sense word 205 is corrected. Error correcting code operation of decoding component 200, with each iteration, may maintain a current iteration of the predetermined number of iterations. Each iteration of the error correcting code, error correcting code operation of decoding component 200, for each bit of sense word 205, calculates a number of unsatisfied check nodes of a respective bit of sense word 205. The number of unsatisfied check nodes of the respective bit of sense word 205 is provided to the comparison module 270.

Error correcting code operation of decoding component 200 may determine a bit flip threshold value to compare with the calculated number of unsatisfied check nodes of the respective bit of sense word 205. In particular, threshold retrieval module 260, based on the respective bit of sense word 205, identifies a soft bit from the soft input 210 associated with the respective bit and a match bit from the match array 230 associated with the respective bit. Threshold retrieval module 260 queries, using the soft bit, the match bit, and a current iteration of the error correcting code operation, a threshold table to obtain the bit flip threshold value. Threshold retrieval module 260 provides the bit flip threshold value to the comparison module 270.

Error correcting code operation of decoding component 200 determines whether the unsatisfied check nodes of the respective bit of sense word 205 satisfy the bit flip threshold value. In particular, the comparison module 270 determines whether to flip a bit of sense word 205 (e.g., based on the number of unsatisfied check nodes exceeding the bit flip threshold value) or not (e.g., based on the number of unsatisfied check nodes not exceeding the bit flip threshold value). Responsive to determining that the bit should be flipped, the comparison module 270 may flip the bit of the sense word 205. The comparison module 270 may compare a value of the flipped bit of the sense word 205 with a value of the original bit of sense word 205 (e.g., obtained from a corresponding bit of the hard input). Responsive to the value of the flipped bit of the sense word 205 matching the value of the original bit of sense word 205, comparison module 270 updates a corresponding bit of the match array 230 to '0', indicating a match. Responsive to the value of the flipped bit of the sense word 205 not matching the value of the original bit of sense word 205, comparison module 270 updates a corresponding bit of the match array 230 to '1', indicating a mismatch.

In some embodiments, a bit error count may be calculated from the match array by counting a number of '1's in the match array. Additionally, the match array and the hard input may be used to generate a codeword estimate. In particular, an XOR operation is performed on the match array and the hard input to obtain the codeword estimate.

Figure 3:
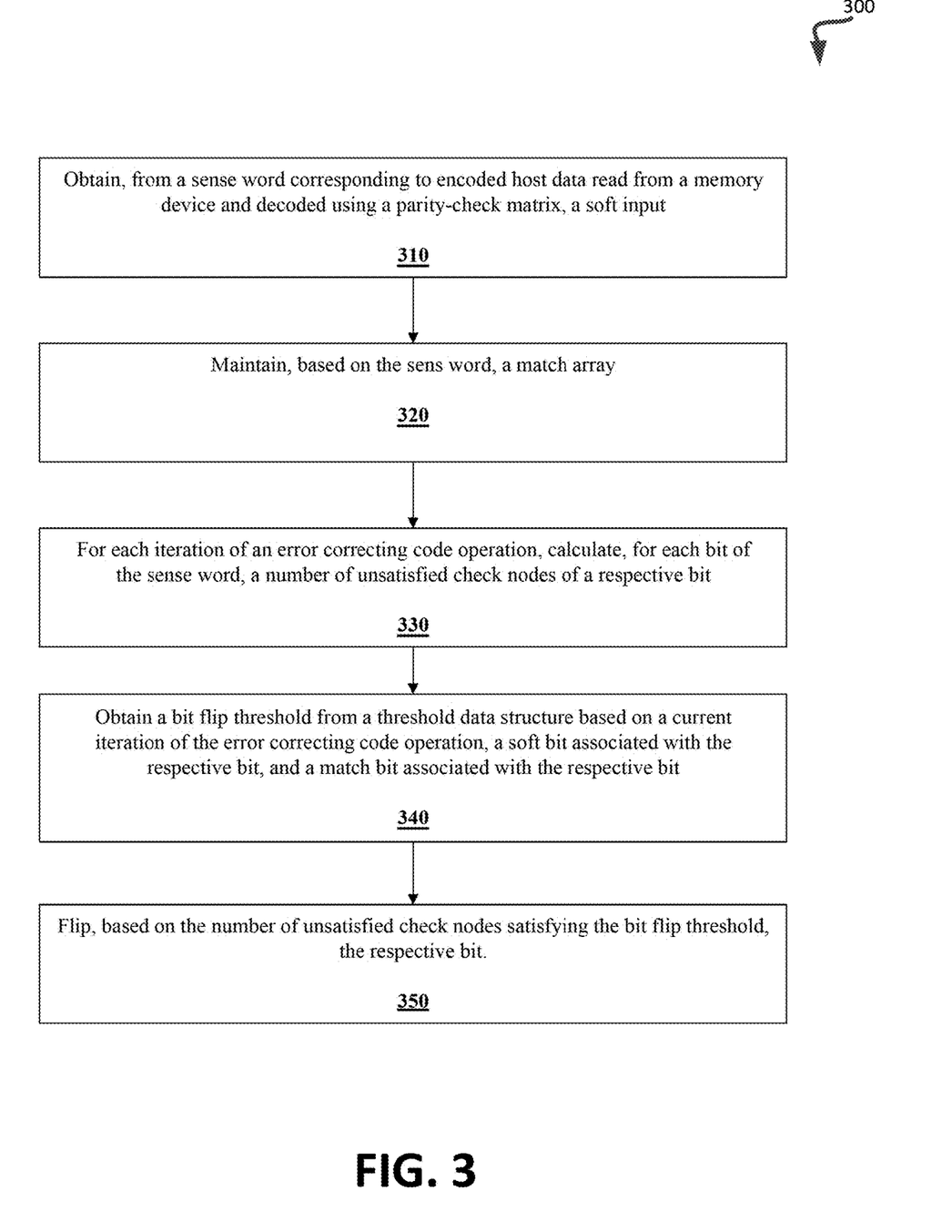
FIG. 3 is a high-level flow diagram of an example method for a dynamic bit flip thresholds based on soft bit and match bit, in accordance with some embodiments.

FIG. 3 is a flow diagram of an example method of dynamic bit flip thresholds based on soft bit and match bit in a memory sub-system in accordance with some embodiments of the present disclosure. Method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by decoding component 113 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device obtains, from a sense word corresponding to encoded host data read from the memory device and decoded using a parity-check matrix, a soft input. The soft input may include a plurality of soft bits each associated with a bit of the sense word. As previously described, the sense word is obtained through a decoding operation which decodes segments of a data array to produce a corresponding string of bits (e.g., a sense word). Hard input may be derived from the sense word which is a sequence of hard bits. The sequence of hard bits are an outcome of a decision-making process where each bit in the sense word is interpreted as a '0' or a '1'. Soft input may be derived from the sense word. Soft input is a sequence of soft bits. The sequence of soft bits is a probability (or a Log-Likelihood Ratio (LLR)) that indicates how likely it is that the corresponding hard bit is a '0' or a '1'. For example, a soft bit may be '0' indicating less reliability that the hard bit is a '0' or '1' or soft bit may be '1' indicating more reliability that the hard bit is a '0' or '1'.

At operation 320, the processing device maintains, based on the sense word, a match array. The match array may include a plurality of match bit each associated with a bit of the sense word. As previously described, the match array may be a sequence of match bits. The sequence of match bits indicate whether a current value of a bit of the sense word matches an original value of the bit of the sense word prior to any error correcting code operations. The match array is initialized by setting a value of each bit of the sequence of match bits to zero ('0'). Match bit of '0' indicates a match between a value of an original bit of the sense word and a value of the bit of the sense word at a specific iteration. Match bit of '1' indicates a mismatch between a value of an original bit of the sense word and a value of the bit of the sense word at a specific iteration.

At operation 330, for each iteration of an error correcting code operation, the processing device calculates, for each bit of the sense word, a number of unsatisfied check nodes of a respective bit of the sense word. As previously described, unsatisfied check nodes refers to the non-zero values within the syndrome vector. A check node is associated with each row of the parity-check matrix. A check node is considered unsatisfied (e.g., unsatisfied check nodes) if the sum of its neighboring variable nodes doesn't satisfy the corresponding parity-check equation (often a modulo-2 sum for binary codes). Variable nodes correspond to bits in the sense word. Accordingly, to obtain the number of unsatisfied check nodes for a respective bit, the number of check nodes that are not satisfied are counted.

At operation 340, the processing device obtains a bit flip threshold from a threshold data structure based on a current iteration of the error correcting code operation, a soft bit associated with the respective bit, and a match bit associated with the respective bit. The threshold data structure includes a plurality of entries containing a bit flip threshold indexed by an iteration of the error correcting code operation and a combination of the soft bit and match bit. In particular, as previously described, the threshold data structure (or table) includes a plurality of rows and a plurality of columns.

Each column of the plurality of columns corresponds to an iteration of the predefined number of iterations. The number of columns of the plurality of columns depends on the predefined number of iterations. Each row of the plurality of rows corresponds to a unique combination a soft bit of the soft input and a match bit of the match array. In particular, each ordered pair of a cartesian product of soft input and match array corresponds to a row of the plurality of rows. Each cell of the threshold table identified by the intersection of a row of the plurality of rows and a column of the plurality of columns stores a bit flip threshold value that would be used to determine whether to flip a bit of the sense word (e.g., based on a number of unsatisfied check nodes associated with the bit exceed the bit flip threshold value) or not (e.g., based on the number of unsatisfied check nodes associated with the bit not exceeding the bit flip threshold value).

At operation 350, the processing device flips, based on the number of unsatisfied check nodes satisfying the bit flip threshold, the respective bit. As previously described, the number of unsatisfied check nodes satisfies the bit flip threshold based on the number of unsatisfied check nodes associated with the bit exceeding the bit flip threshold value. The number of unsatisfied check nodes does not satisfy the bit flip threshold based on the number of unsatisfied check nodes associated with the bit not exceeding the bit flip threshold value.

Depending on the embodiment, the processing device determines whether a value of the respective bit after being flipped matches the original value of the respective bit. As previously described, a value of the flipped respective bit is compared to a value of the original respective bit (e.g., a hard bit of the hard input associated with the respective bit). Based on the comparison, a corresponding bit of the match array is updated (e.g., set the corresponding bit to '0' if they match, otherwise, set the corresponding bit to '1').

Depending on the embodiment, the processing device determines a bit error count based on the match array. As previously described, the processing device may determine the bit error count by counting a number of '1's in the match array.

Depending on the embodiment, the processing device determines a codeword estimate based on the match array and hard input. As previously described, the processing device may determine the codeword estimate by performing an XOR operation on the match array and the hard input.

Figure 4:
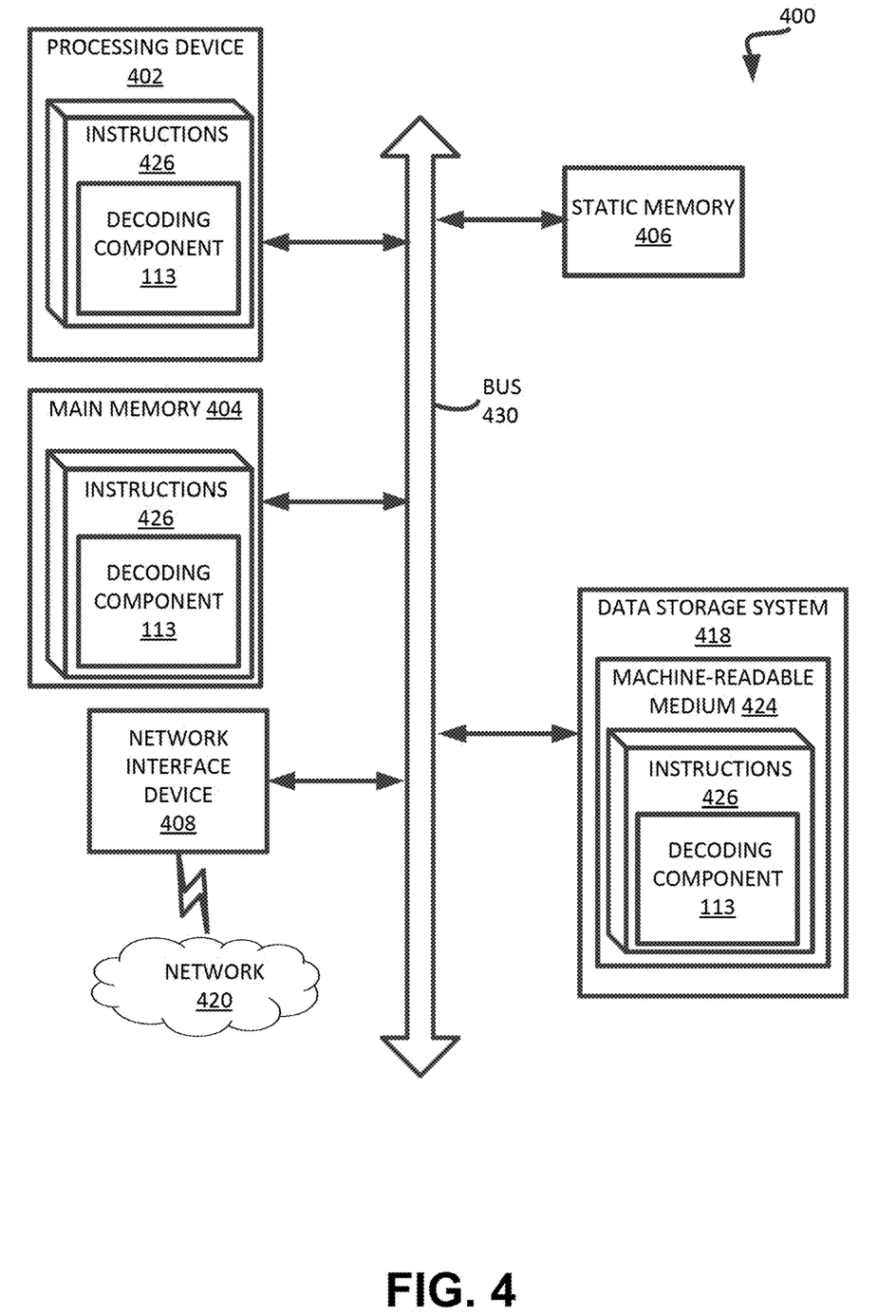
FIG. 4 is a block diagram of an example computer system in which embodiments of the present disclosure may operate.

FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the decoding component 113 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1A.

In one embodiment, the instructions 426 include instructions to implement functionality corresponding to the decoding component 113 of FIG. 1A). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

What is claimed is:

1. A system comprising:
a memory device; and
a processing device coupled to the memory device, the processing device to perform operations comprising:
obtaining, from a sense word corresponding to encoded host data read from the memory device and decoded using a parity-check matrix, a soft input, wherein the soft input comprises a plurality of soft bits, each associated with a bit of the sense word;
maintaining, based on the sense word, a match array, wherein the match array comprises a plurality of match bits, each match bit associated with a bit of the sense word;
for each iteration of an error correcting code operation, calculating, for each bit of the sense word, a number of unsatisfied check nodes of a respective bit of the sense word;
obtaining a bit flip threshold from a threshold data structure based on a current iteration of the error correcting code operation, a soft bit associated with the respective bit, and a match bit associated with the respective bit; and
flipping, based on the number of unsatisfied check nodes satisfying the bit flip threshold, the respective bit.

2. The system of claim 1, wherein the processing device is to perform operations further comprising:
determining whether a value of the respective bit after being flipped matches an original value of the respective bit;
responsive to determining that value of the respective bit after being flipped matches the original value of the respective bit, updating the match bit associated with the respective bit to indicate a match; and
responsive to determining that value of the respective bit after being flipped does not match the original value of the respective bit, updating the match bit associated with the respective bit to indicate a mismatch.

3. The system of claim 1, wherein maintaining, based on the sense word, the match array further comprises: initializing the match array by setting each match bit of the plurality of match bit to zero.

4. The system of claim 1, wherein the threshold data structure includes a plurality of entries, each entry containing a bit flip threshold and obtained by an intersection of an iteration of the error correcting code operation and a combination of the soft bit and match bit.

5. The system of claim 1, wherein the number of unsatisfied check nodes satisfies the bit flip threshold by determining that the number of unsatisfied check nodes exceeds the bit flip threshold.

6. The system of claim 1, wherein the processing device is to perform operations further comprising:
determining, based on the match array, a bit error count.

7. The system of claim 1, wherein the processing device is to perform operations further comprising:
determining, based on the match array and a hard input, a codeword estimate.

8. A method comprising:
obtaining, from a sense word corresponding to encoded host data read from a memory device and decoded using a parity-check matrix, a soft input, wherein the soft input comprises a plurality of soft bits, each associated with a bit of the sense word;
maintaining, based on the sense word, a match array, wherein the match array comprises a plurality of match bits, each match bit associated with a bit of the sense word;
for each iteration of an error correcting code operation, calculating, for each bit of the sense word, a number of unsatisfied check nodes of a respective bit of the sense word;
obtaining a bit flip threshold from a threshold data structure based on a current iteration of the error correcting code operation, a soft bit associated with the respective bit, and a match bit associated with the respective bit; and
flipping, based on the number of unsatisfied check nodes satisfying the bit flip threshold, the respective bit.

9. The method of claim 8, further comprising:
determining whether a value of the respective bit after being flipped matches an original value of the respective bit;
responsive to determining that value of the respective bit after being flipped matches the original value of the respective bit, updating the match bit associated with the respective bit to indicate a match; and
responsive to determining that value of the respective bit after being flipped does not match the original value of the respective bit, updating the match bit associated with the respective bit to indicate a mismatch.

10. The method of claim 8, wherein maintaining, based on the sense word, the match array further comprises: initializing the match array by setting each match bit of the plurality of match bit to zero.

11. The method of claim 8, wherein the threshold data structure includes a plurality of entries, each entry containing a bit flip threshold and obtained by an intersection of an iteration of the error correcting code operation and a combination of the soft bit and match bit.

12. The method of claim 8, wherein the number of unsatisfied check nodes satisfies the bit flip threshold by determining that the number of unsatisfied check nodes exceeds the bit flip threshold.

13. The method of claim 8, further comprising:
determining, based on the match array, a bit error count.

14. The method of claim 8, further comprising:
determining, based on the match array and a hard input, a codeword estimate.

15. A non-transitory computer-readable storage medium comprising instructions that, when executed by a processing device, cause the processing device to perform operations comprising:
obtaining, from a sense word corresponding to encoded host data read from a memory device and decoded using a parity-check matrix, a soft input, wherein the soft input comprises a plurality of soft bits, each associated with a bit of the sense word;

maintaining, based on the sense word, a match array, wherein the match array comprises a plurality of match bits, each match bit associated with a bit of the sense word;

for each iteration of an error correcting code operation, calculating, for each bit of the sense word, a number of unsatisfied check nodes of a respective bit of the sense word;

obtaining a bit flip threshold from a threshold data structure based on a current iteration of the error correcting code operation, a soft bit associated with the respective bit, and a match bit associated with the respective bit; and flipping, based on the number of unsatisfied check nodes satisfying the bit flip threshold, the respective bit.

16. The non-transitory computer-readable storage medium of claim 15, wherein the processing device is caused to perform operations further comprising:

determining whether a value of the respective bit after being flipped matches an original value of the respective bit;

responsive to determining that value of the respective bit after being flipped matches the original value of the respective bit, updating the match bit associated with the respective bit to indicate a match; and responsive to determining that value of the respective bit after being flipped does not match the original value of the respective bit, updating the match bit associated with the respective bit to indicate a mismatch.

17. The non-transitory computer-readable storage medium of claim 15, wherein maintaining, based on the sense word, the match array further comprises: initializing the match array by setting each match bit of the plurality of match bit to zero.

18. The non-transitory computer-readable storage medium of claim 15, wherein the threshold data structure includes a plurality of entries, each entry containing a bit flip threshold and obtained by an intersection of an iteration of the error correcting code operation and a combination of the soft bit and match bit.

19. The non-transitory computer-readable storage medium of claim 15, wherein the number of unsatisfied check nodes satisfies the bit flip threshold by determining that the number of unsatisfied check nodes exceeds the bit flip threshold.

20. The non-transitory computer-readable storage medium of claim 15, wherein the processing device is caused to perform operations further comprising:

determining, based on the match array and a hard input, a codeword estimate.

* * * * *